United States Patent
Shin (10) Patent No.: US 9,699,662 B2
(45) Date of Patent: Jul. 4, 2017

(54) BROADCASTING RECEIVING APPARATUS, EXTERNAL APPARATUS, METHOD FOR GENERATING SIGNAL, AND METHOD FOR RECEIVING SIGNAL

(71) Applicant: SAMSUNG ELECTRONICS CO., LTD., Suwon-si (KR)

(72) Inventor: Hyun-jong Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/579,189

(22) Filed: Dec. 22, 2014

(65) Prior Publication Data

US 2015/0215789 A1 Jul. 30, 2015

(30) Foreign Application Priority Data

Jan. 28, 2014 (KR) .................. 10-2014-0010304

(51) Int. Cl.
*H04W 16/14* (2009.01)
*H04W 72/04* (2009.01)
*H04W 72/08* (2009.01)

(52) U.S. Cl.
CPC ....... *H04W 16/14* (2013.01); *H04W 72/0453* (2013.01); *H04W 72/082* (2013.01)

(58) Field of Classification Search
CPC  H04W 16/14; H04W 72/0453; H04W 72/082
See application file for complete search history.

(56) References Cited

U.S. PATENT DOCUMENTS

| | | | |
|---|---|---|---|
| 8,295,226 B2 * | 10/2012 | Fujii | H04W 16/14 370/319 |
| 8,341,678 B1 | 12/2012 | Du Val | |
| 8,532,041 B1 * | 9/2013 | Lambert | H04W 72/0406 370/329 |
| 8,627,401 B2 * | 1/2014 | Yang | H04N 5/4403 725/148 |
| 2010/0027482 A1 * | 2/2010 | Murakami | H04L 5/0037 370/329 |
| 2010/0124254 A1 | 5/2010 | Wu et al. | |
| 2013/0023216 A1 * | 1/2013 | Moscibroda | H04W 16/14 455/63.1 |

(Continued)

FOREIGN PATENT DOCUMENTS

| | | |
|---|---|---|
| EP | 2337390 A1 | 6/2011 |
| JP | 2010-68534 A | 3/2010 |

(Continued)

OTHER PUBLICATIONS

International Search Report (PCT/ISA/210) issued Feb. 16, 2015, in International Application No. PCT/KR2014/011664.

(Continued)

*Primary Examiner* — Nathan Mitchell
(74) *Attorney, Agent, or Firm* — Sughrue Mion, PLLC (57) ABSTRACT

A method for generating a signal of a broadcasting receiving apparatus is provided. The method includes receiving a broadcasting signal, setting a guide band frequency according to a preset frequency range and a tuned frequency, and transmitting information for the set guide band frequency to at least one external apparatus.

23 Claims, 8 Drawing Sheets

(56) References Cited

U.S. PATENT DOCUMENTS

2014/0080501 A1 3/2014 Lee et al.
2014/0248916 A1* 9/2014 Nakamuru ........ H04W 72/0453
                455/501

FOREIGN PATENT DOCUMENTS

KR 10-2008-0020782 A 3/2008
WO 2012173434 A2 12/2012

OTHER PUBLICATIONS

Written Opinion (PCT/ISA/237) issued Feb. 16, 2015, in International Application No. PCT/KR2014/011664.
Communication dated Apr. 4, 2017, issued by the European Patent Office in counterpart European Application No. 14880408.1.

* cited by examiner

BROADCASTING RECEIVING APPARATUS, EXTERNAL APPARATUS, METHOD FOR GENERATING SIGNAL, AND METHOD FOR RECEIVING SIGNAL

CROSS-REFERENCE TO RELATED APPLICATION

This application claims priority from Korean Patent Application No. 10-2014-0010304, filed on Jan. 28, 2014, in the Korean Intellectual Property Office, the disclosure of which is incorporated herein by reference in its entirety.

BACKGROUND

1. Field

Apparatuses and methods consistent with exemplary embodiments relate to a signal generating method of a broadcasting receiving apparatus, and more particularly, to a broadcasting receiving apparatus, an external apparatus, a signal generating method, and a signal receiving method, which allocate a white space region to prevent interference in broadcasting tuning frequency from occurring.

2. Description of the Related Art

WiFi frequency, which has recently been widely used, has a frequency band of 2.4 GHz or 5 GHz and has strong linearity and weak diffractive properties on high frequency characteristics. Therefore, communication quality characteristics are affected in these used frequency spaces.

In recent years, as communication usage of devices is increased, available frequency becomes insufficient. Therefore, to efficiently use frequency, methods, which allocate the remaining neighboring frequency bands other than the frequency band used in a television (TV) to other devices, have been discussed. Such a frequency band is referred to as an idle band or a white space. The policy that permits the white space to other devices has been promoted in Europe.

In response to using this white space band, frequency exhaustion is expected to be solved to a certain degree. Further, since frequency of a TV band having a high diffractive property can be used, quality deterioration may be somewhat solved according space characteristics in high frequency.

However, in response to the other devices using the white frequency band to the frequency used in a TV is affected, and thus a screen may be broken or a channel may be skipped.

Therefore, there is a need for a method for solving an occurrence of interference in the frequency used in a TV in response to the devices using the frequency of the white space band.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments are to provide a broadcasting receiving apparatus, an external apparatus, a signal generating method, and a signal receiving method, which solve occurrence of interference in frequency used in a TV in response to devices using frequency of a white space band.

According to an aspect of an exemplary embodiment, there is provided a method for generating a signal of a broadcasting receiving apparatus. The method includes receiving a broadcasting signal by tuning frequency; setting a guide band frequency according to a frequency of a preset range and a tuned frequency to, and transmitting information for the set guide band frequency to at least one external apparatus.

The setting to the guide band frequency may include setting the guide band frequency with respect to a region in which interference occurs in the tuned frequency in response to a region of the frequency of the preset range being used by the at least one external apparatus.

The setting to the guide band frequency may include setting the guide band frequency according to at least one of a signal level of the tuned frequency and a signal to noise ratio (SNR) of the tuned frequency.

The setting to the guide band frequency may include setting to correspond to an upper-rank one channel and a lower-rank one channel on the basis of the tuned frequency to the guide band frequency.

The at least one external apparatus may use a frequency region other than the tuned frequency and the set guide band frequency as a white space.

According to another exemplary embodiment, there is provided a method for receiving a signal of an external apparatus including requesting information for guide band frequency from a broadcasting receiving apparatus, receiving the information for the guide band frequency from the broadcasting receiving apparatus, and setting frequency other than the received guide band frequency to a communication frequency, where the broadcasting receiving apparatus may set frequency of a preset range on the basis of tuned frequency to the guide band frequency.

The guide band frequency may be set with respect to a region in which interference occurs in the tuned frequency in response to a region of the frequency of the preset range being used by the external apparatus.

The guide band frequency may be set according to at least one of a signal level of the tuned frequency and a signal to noise ratio (SNR) of the tuned frequency.

The guide band frequency may be set to correspond to an upper-rank one channel and a lower-rank one channel on the basis of the tuned frequency may be set as the guide band frequency.

The setting to the communication frequency may include using a frequency region other than the tuned frequency and the set guide band frequency as a white space.

According to another exemplary embodiment, there is provided a broadcasting receiving apparatus including a broadcasting receiver configured to receive a broadcasting signal, a controller configured to set a guide band frequency according to frequency of a preset range and a tuned frequency, and a communication unit configured to transmit information for the guide band frequency to at least one external apparatus.

The controller may set the guide band frequency with respect to a region in which interference occurs in the tuned frequency in response to a region of the frequency of the preset range being used by the at least one external apparatus.

The controller may set the guide band frequency according to at least one of a signal level of the tuned frequency and a signal to noise ratio (SNR) of the tuned frequency.

The controller may set the guide band frequency to correspond to an upper-rank one channel and a lower-rank one channel according to the guide band frequency.

The at least one external apparatus may use a frequency region other than the tuned frequency and the set guide band frequency as a white space.

According to another exemplary embodiment, there is provided an external apparatus including a communication unit configured to request information for a guide band frequency from a broadcasting receiving apparatus and receive the information for the guide band frequency from the broadcasting receiving apparatus, and a controller configured to set frequency other than the guide band frequency to a communication frequency, where the broadcasting receiving apparatus sets the guide band frequency according to frequency of a preset range and a tuned frequency.

The guide band frequency may be set with respect to a region in which interference occurs in the tuned frequency in response to a region of the frequency of the preset range being used by the external apparatus.

The guide band frequency may be set according to at least one of a signal level of the tuned frequency and a signal to noise ratio (SNR) of the tune frequency.

The guide band frequency may be set to correspond to an upper-rank one channel and a lower-rank one channel on the basis of the tuned frequency may be set as the guide band frequency.

The controller may use a frequency region other than the tuned frequency and the set guide band frequency as a white space.

According to another exemplary embodiment, there is provided a broadcasting receiving device, including a broadcasting receiver configured to receive a broadcasting signal, a controller configured to set a guide band frequency range, and a controller configured to communicate with at least one external device, where the guide band frequency is set according to a preset frequency range and a tuned frequency.

The tuned frequency may correspond to the received broadcasting signal.

A low end of the guide band frequency may be set by subtracting the preset frequency range to the tuned frequency, and a high end of the guide band frequency may be set by adding the preset frequency range to the tuned frequency.

The guide band frequency may be transmitted to the at least one external device.

According to another exemplary embodiment, there is provided a method for generating a signal for a broadcasting receiving device, including receiving a broadcasting signal, and setting a guide back frequency range, where the guide band frequency is set according to a preset frequency range and a tuned frequency.

The method may also include transmitting the guide band frequency to at least one external device.

The tuned frequency may correspond to the received broadcasting signal.

A low end of the guide band frequency may be set by subtracting the preset frequency range to the tuned frequency, and a high end of the guide band frequency may be set by adding the preset frequency range to the tuned frequency According to the above-described various exemplary embodiments, the interference which occurs in frequency used in a TV in response to the device using frequency of a white space band may be solved.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Hereinafter, exemplary embodiments will be described in more detail with reference to the accompanying drawings.

Hereinafter, the terms "unit" or "module" refer to a software component, or a hardware component such as FPGA or ASIC, and performs a certain function. However, the "unit" or "module" are not limited to software or hardware. The "unit" or "module" may be configured in an addressable storage medium and may be configured to be executed by one or more processors. Hence, the "unit" or "module" include elements such as software elements, object-oriented software elements, class elements, and task elements, and processes, functions, attributes, procedures, subroutines, segments of program codes, drivers, firmware, micro-codes, circuits, data, databases, data structures, tables, arrays, and variables. The functions provided in the elements, units, and modules may be combined into a fewer number of elements and units or may be divided into a larger number of elements, units, and modules.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
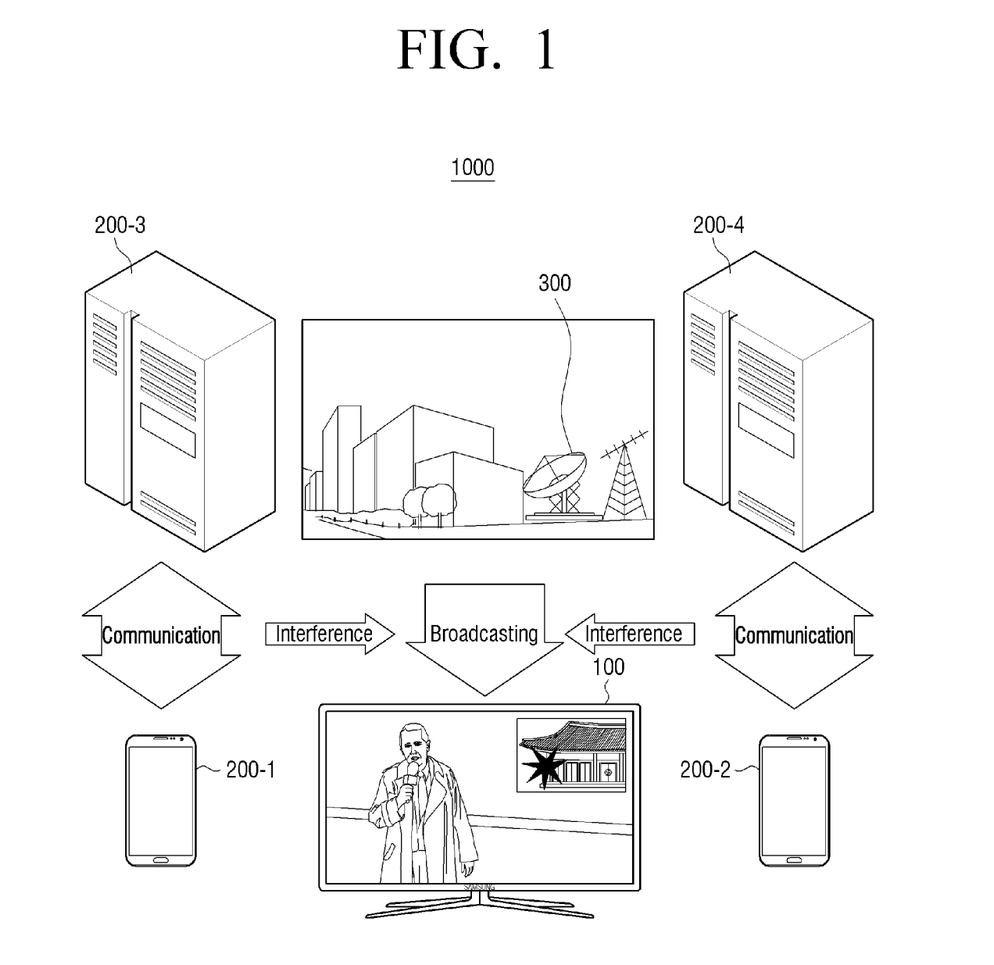
FIG. 1 is a reference view explaining a problem of an exemplary embodiment.

FIG. 1 is a reference view explaining a problem of a broadcasting system 1000 according to an exemplary embodiment.

As illustrated in FIG. 1, a broadcasting station 300 transmits broadcasting using allocated frequency, and a broadcasting receiving apparatus 100 tunes frequency to receive the transmitted broadcasting. In general, frequency having a band of 470 to 698 MHz is used as digital broadcasting frequency in Korea. An extra frequency band of 54 to 216 MHz is reserved.

External apparatuses 200-1, 200-2, 200-3, and 200-4 perform wireless communication between apparatuses using communication frequency other than the above-described frequency. The communication frequency may be versatile, but a frequency band of 2.4 GHz or 5 GHz is a standard WiFi frequency.

In recent years, as communication usage is increased, available frequency becomes insufficient. Therefore, to efficiently use frequency, methods, which allocate the remaining neighboring frequency bands other than the frequency band used in a television (TV) to other devices, have been discussed. Such a frequency band is referred to as an idle band or a white space. The policy that allocates the white space to the other device has been promoted in Europe.

That is, in response to the external apparatuses 200-1, 200-2, 200-3, and 200-4 using neighboring frequency bands of the broadcasting receiving apparatus 100 as described above, frequency interference may occur. As illustrated in FIG. 1, the communication between the external apparatuses 200-3 and 200-1 and 200-4 and 200-2 may cause interference in the broadcasting reception of the broadcasting receiving apparatus 100, and thus several problems can occur. For example, a screen ban be broken or a channel can be skipped. According to an exemplary embodiment, there is a method for solving such a problem.

Figure 2:
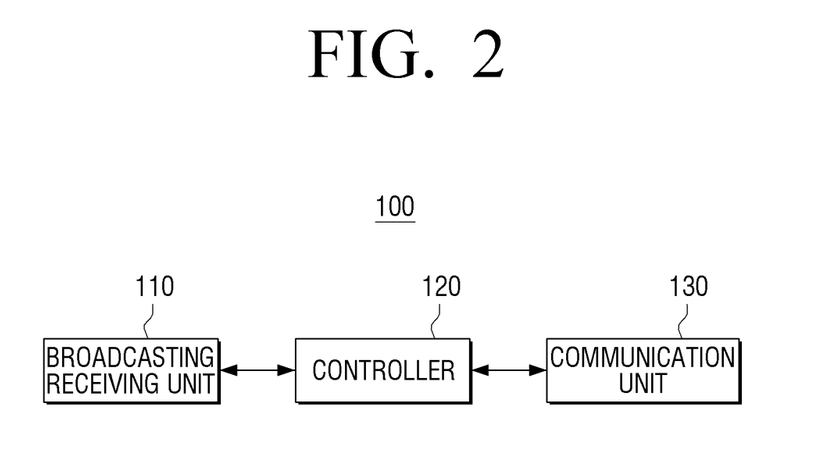
FIG. 2 is a block diagram illustrating a configuration of a broadcasting receiving apparatus according to an exemplary embodiment.

FIG. 2 is a block diagram illustrating a configuration of a broadcasting receiving apparatus according to an exemplary embodiment.

Referring to FIG. 2, a broadcasting receiving apparatus 100 according to an exemplary embodiment includes a broadcasting receiving unit (i.e., broadcasting receiver) 110, a controller 120, and a communication unit 130.

The broadcasting receiving apparatus 100 according to the exemplary embodiment may be an apparatus which includes one or more displays, and receives broadcasting from a broadcast content provider and displays the broadcasting. For example, the broadcasting receiving apparatus 100 may be implemented by any one from among a digital TV, a tablet personal computer (PC), a portable multimedia player (PMP), a personal digital assistant (PDA), a smart phone, a portable phone, a digital picture frame, a digital signage, and a kiosk.

The broadcasting receiving unit 110 is configured to receive a broadcasting signal transmitted from a broadcasting station. That is, the broadcasting receiving unit 110 may receive broadcast program content from the broadcasting station using a broadcasting network. At this time, the broadcasting receiving unit 110 may include components such as a tuner (not shown) and a demodulator (not shown).

The tuner selects a radio frequency (RF) broadcasting signal corresponding to a selected channel among RF broadcasting signals received through an antenna, and converts the selected RF broadcasting signal into an intermediate frequency (IF) signal or a base band video or audio signal. In response to the selected RF signal being a digital broadcasting signal, the tuner converts the selected RF broadcasting signal into a digital IF signal. In response to the selected RF broadcasting signal being an analog broadcasting signal, the tuner converts the selected RF broadcasting signal into an analog base band image or audio signal, that is, a Composite Video Banking Synchronous or a Sound Intermediate Frequency (CVBS SIF) signal. An output signal from the tuner is input to a signal processor (not shown). The tuner may receive a single-carrier RF broadcasting signal according to an Advanced Television System Committee (ATSC) method or a multi-carrier RF broadcasting signal according to a Digital Video Broadcasting (DVB) method.

The demodulator receives the digital IF signal converted in the tuner and performs a demodulation operation on the received digital IF signal. In response to the digital IF signal output from the tuner unit being the ATSC method, the demodulator performs 8-Vestigal Side Band (8-VSB) demodulation. In response to the digital IF signal output from the tuner unit being the DVB method, the demodulator performs Coded Orthogonal Frequency Division multiplexing (COFDM) modulation. Further, the demodulator may perform channel decoding such as Trellis decoding, deinterleaving, or Reed-Solomon decoding.

In response to performing the channel decoding, a stream signal (TS) is output. The stream signal may be a signal in which a video signal, an audio signal, and a data signal are multiplexed. For example, the stream signal may be a moving picture experts group-2 transport stream (MPEG-2 TS) in which a video signal of an MPEG-2 standard, an audio signal of a Dolby audio compression (AC)-3 standard, and the like are multiplexed. The stream signal output from the demodulator is input to a signal processor.

The broadcasting receiving unit 110 may receive content from a settop box. The settop box may support bidirectional communication to support an Internet protocol (IP) TV.

The broadcasting receiving unit 110 may include at least one of the above-described various technical components, and receive content from a plurality of different modules. The signal processor (not shown) performs signal processing on the content received from each of the different modules.

The controller 120 controls an overall operation of the broadcasting receiving apparatus 100. In particular, the controller 120 sets frequency of a preset range on the basis of tuned frequency to guide band frequency. For example, the controller 120 sets frequencies of a frequency range of the guide band frequency by adding a preset frequency to the tuned frequency and subtracting the preset frequency from the tuned frequency. Here, the guide band frequency is frequency which the broadcasting receiving apparatus 100 significantly affects according to a currently tuned frequency in response to the frequency region being within a frequency range of the external apparatus. According to one exemplary embodiment, the guide band frequency is prohibited to be used by the external apparatus. Therefore, the set guide band frequency has to be prohibited to be accessed by the external apparatus. The guide band frequency will be described in detail later.

The controller 120 may include a hardware configuration such as a micro processing unit (MPU), a central processing unit (CPU), a cache memory, or a data bus, and a software configuration such as an operating system or an application which performs a specific purpose. A control command for each component which is necessary for an operation of a multi broadcasting receiving apparatus 100 is read from a memory according to a system clock, and the controller 120 generates an electrical signal according to the read control signal and operates each component of the hardware configuration.

The communication unit 130 is configured to perform communication with the external apparatuses (see 200-1 to 200-4 of FIG. 1) (hereinafter, collectively referred to as the external apparatus 200). That is, in response to a request of the external apparatus 200, the communication unit 130 transmits information for the set guide band frequency to the external apparatus 200. The external apparatus 200 may not use the set guide band frequency band as a white space.

The communication unit 130 may transmit the guide band frequency band to the external apparatus 200 at preset time intervals. To this end, the controller 120 may reset the guide band frequency band at preset time intervals.

In an opened frequency environment in which new external apparatuses may use a white space band, the controller 120 may have to reset the guide band frequency, and transmit the reset guide band frequency to the external apparatuses newly entered in the frequency environment through the communication unit 130, at a short cycle. In response to the number of external apparatuses and a kind of external apparatus being limited, the controller 120 may have to reset the guide band frequency, and transmit the reset guide band frequency, at a longer cycle than the cycle described above.

Further, in response to frequency tuning newly performed by the broadcasting receiving apparatus 100, for example, in response to a broadcasting receiving channel being changed, the controller 120 may reset the guide band frequency and transmit the reset guide band frequency to the external apparatus 200.

Alternatively, the broadcasting receiving apparatus 100 may perform an auto scan to ensure total channel frequencies, and at this time, the broadcasting receiving apparatus 100 may collectively set guide band frequencies for the total channel frequencies. For example, in response to checking that reception signals exist in 474 MHz, 666 MHz, and 754 MHz in the auto scan, the broadcasting receiving apparatus 100 may set the guide band frequencies to 474 MHz±1 channel, 666 MHz±1 channel, and 754 MHz±1 channel and transmit the reception signals. Therefore, a white space effect to the total channels may be removed. The communication unit 130 may be implemented with various communication techniques. Typically, the communication unit 130 may include a short-range communication module. At this time, the broadcasting receiving apparatus 100 may be connected to a relay apparatus through the short-range communication module and may communicate with the external apparatus 200.

In an exemplary embodiment, the communication unit 130 may comply with a WiFi communication standard. A WiFi module performs short-range communication which complies with the Institute of Electrical and Electronic Engineers (IEEE) 802.11 technical standard. According to the IEEE 802.11 technical standard, spread spectrum type wireless communication technology called single-carrier direct sequence spread spectrum (DSSS) and OFDM type wireless communication technology known as multi-carrier OFDM are used.

In another exemplary embodiment, the communication unit 130 may be implemented using various mobile communication techniques. That is, the communication unit 130 may include a cellular communication module which may transmit and receive data using an existing wireless telephone network. For example, third generation (3G) mobile communication technology may be applied. That is, at least one technique among wideband code division multiple access (WCDMA), high speed downlink packet access (HSDPA), high speed uplink packet access (HSUPA), and high speed packet access (HSPA) may be applied.

Alternatively, 4G mobile communication technology may be applied. According to an exemplary embodiment, 2.3 GHz (portable Internet) mobile WiMAX, or WiBro, is Internet technology which can be used in high-speed moving.

Further, 4G long term evolution (LTE) technology may be applied. LTE is extension technology of WCDMA, and is technology based on orthogonal frequency division multiplexing access (OFDMA) technology and multiple-input multiple-output (MIMO: multiplexing antenna) technology. The 4G LTE technology uses WCDMA technology, and thus has an advantage of using an existing network.

As described above, WiMAX, WiFi, 3G, LTE or the like which has a wide bandwidth and high efficiency may be used. However, in the exemplary embodiment, it is considered that an amount of data transfer is not large, and thus more efficient technology may be used. That is, other short-range communication modules such as a Blutooth module, an infrared data association (IrDA) module, a near field communication (NFC) module, a Zigbee module, or a wireless local area network (WLAN) module may be applied.

The controller 120 sets the guide band frequency with respect to a region in which interference occurs in the tuned frequency in response to a frequency region of the preset range being used by the external apparatus 200. That is, the controller 120 may not set the guide band frequency to a region in which interference does not occur in the tuned frequency. This is because the region is maximally allowed to be freely used by the external apparatus 200.

The controller 120 may set the guide band frequency by considering at least one of a signal level and a signal to noise ratio (SNR) of the tuned frequency. For example, in response to the frequency region of the preset range being used by the external apparatus 200, the frequency region of the preset range has to be set as the guide band frequency in response to the signal level of the tuned frequency being lowered. However, in response to the signal level of the tuned frequency being unaffected by the frequency region of the preset range or being insignificantly lowered, the frequency region of the preset range may not necessarily be set as the guide band frequency and has to be permitted to be freely used by the external apparatus 200. A method of setting the guide band frequency by considering the SNR is similar to the above-described method of setting the guide band frequency. In response to the frequency region of the preset range being used by the external apparatus 200, the frequency region of the preset range may be set to the guide band frequency in response to the SNR being increased. Otherwise, the frequency region of the preset range may not necessarily be set to the guide band frequency.

Figure 3:
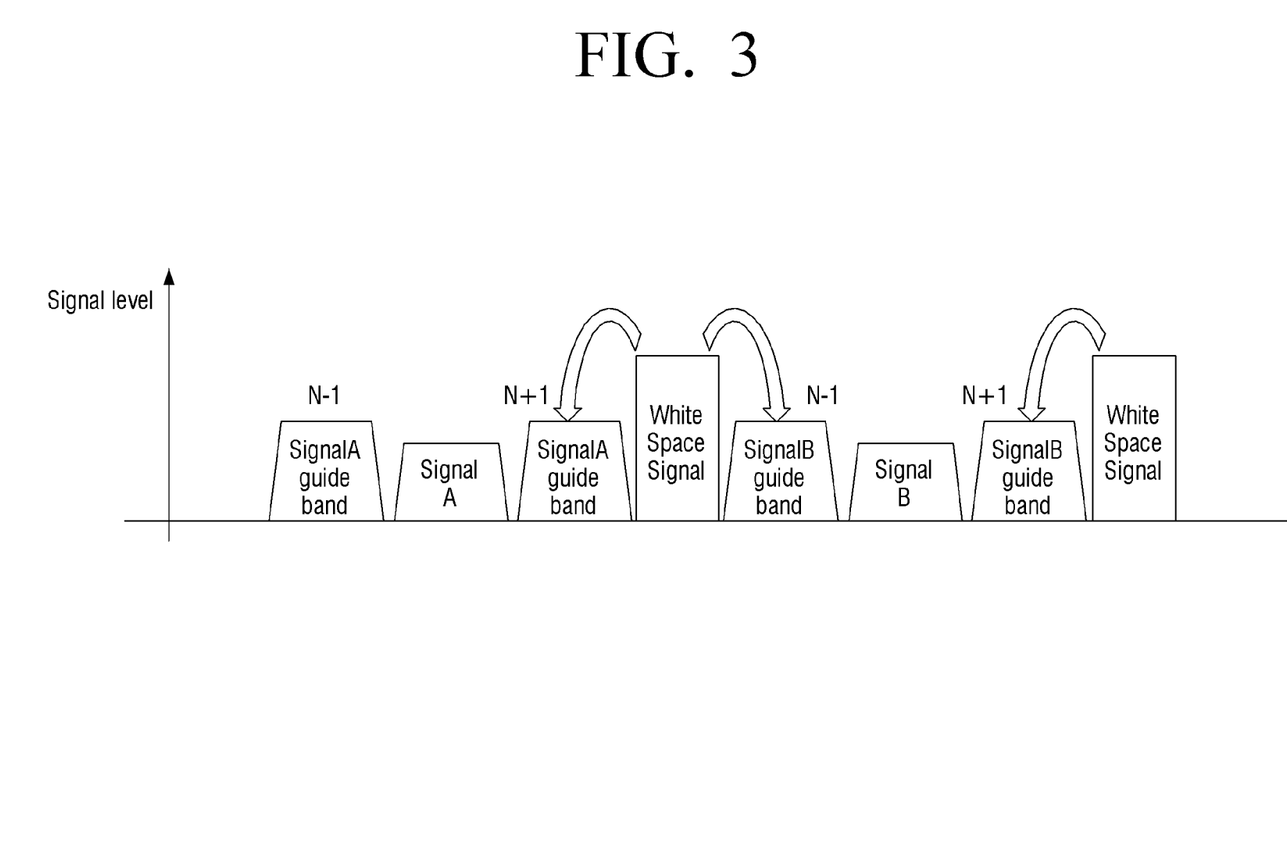
FIG. 3 is a view illustrating one criterion for setting guide band frequency.

FIG. 3 is a view illustrating one criterion for setting guide band frequency.

As illustrated in FIG. 3, the controller 120 may set frequencies corresponding to an upper-rank one channel (N+1 channel) and a lower-rank one channel (N−1 channel) on the basis of tuned frequency to the guide band frequency. That is, the controller 120 may tune the frequencies corresponding to the upper-rank one channel and the lower-rank one channel on the basis of a channel corresponding to the tuned frequency to the guide band frequency. However, in response to the external apparatus 200 using a white space out of the upper-rank one channel region and the lower-rank one channel region, the controller 120 may set the upper-rank two channels or more and the lower-rank two channels or more from the guide band frequency in response to the tuned frequency being unaffected. That is, the controller 120 may change a setting of the guide band frequency according to usage environments of the external apparatus 200 and the broadcasting receiving apparatus 100.

Figure 4:
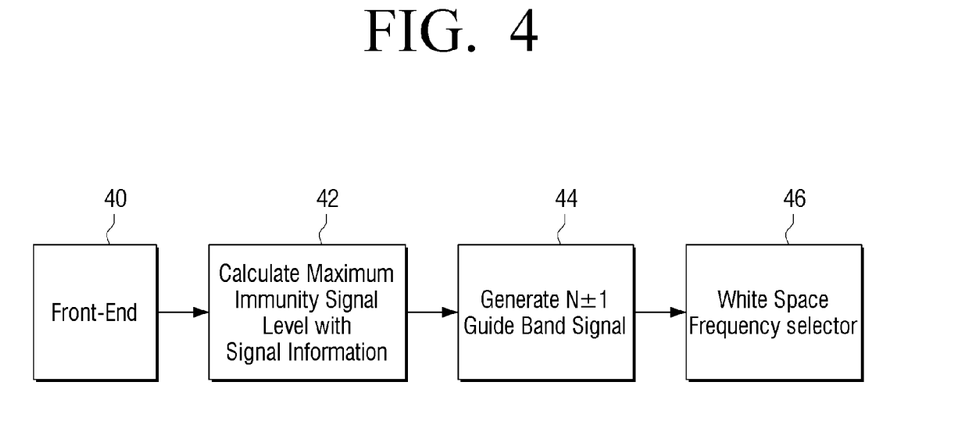
FIG. 4 is a schematic view illustrating a process of selecting a white space.

In response to the guide band frequency being set in the broadcasting apparatus 100 and the external apparatus 200 being notified, the external apparatus 200 selects a white space to be used. FIG. 4 schematically illustrates the above-described process.

That is, FIG. 4 is a view schematically illustrating a process of selecting a white space according to an exemplary embodiment.

As illustrated in FIG. 4, first, the broadcasting receiving apparatus 100 selects broadcasting at a front end tuner (40), and the broadcasting receiving apparatus 100 calculates a maximum immunity signal level, in which interference may not occur in response to the external apparatus communicating in a white space, based on signal information (42). The maximum immunity signal level may be defined as a maximum signal level for transmitting a guide band signal by considering a level and quality of a signal currently received in the broadcasting receiving apparatus 100. For example, an intensity of the signal of the broadcasting receiving apparatus 100 may be represented in a value. A substantial input signal level may be represented by about −50 dBm in response to the intensity of the signal being 90. For example, under the assumption that the broadcasting receiving apparatus 100 has an input signal level of −50 dBm, and endurance of 20 dBm to an adjacent signal level, interference may not occur even in response to a signal level of the external apparatus 200 being −30 dBm. At this time, the maximum immunity signal level may be regarded as −30 dBm. Therefore, in response to the broadcasting receiving apparatus 100 setting the guide band frequency to below −30 dBm, the interference with the external apparatus 200 using the white space may not occur.

In response to the guide band signal being generated by the broadcasting receiving apparatus 100 (44), and information for the generated guide band signal being provided to the external apparatus 200, the external apparatus 200 selects white space frequency to be used (46).

Figure 5:
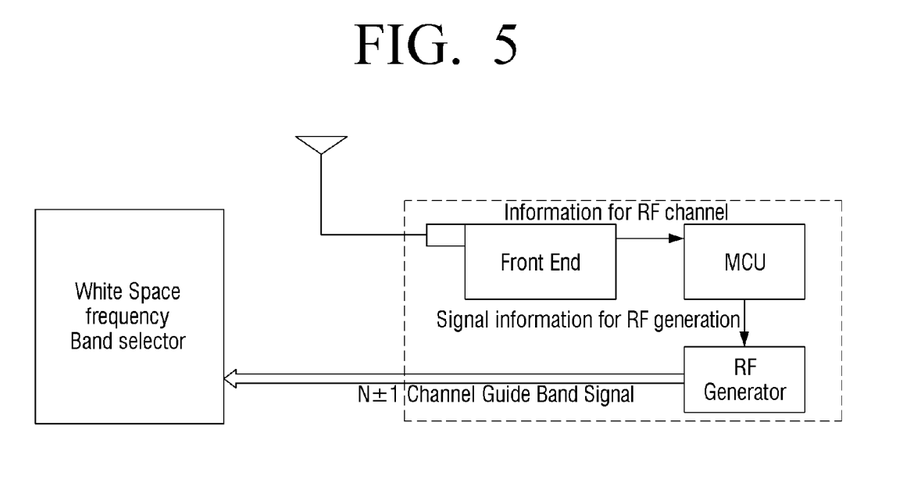
FIG. 5 is a view illustrating a circuit configuration of a broadcasting receiving apparatus and an external apparatus.

FIG. 5 is a view illustrating a circuit configuration of a broadcasting receiving apparatus and an external apparatus according to an exemplary embodiment.

FIG. 5 illustrates the process of FIG. 4 in a circuit. A front-end tuner of the broadcasting receiving apparatus 100 in FIG. 5 selects broadcasting, a microprocessor MCU calculates a maximum immunity signal level in which interference may not occur in response to the external apparatus communicating in the white space based on signal information. Then, a radio frequency (RF) generator generates a guide band signal using the maximum immunity signal level and provides the guide band signal to the external apparatus 200. The external apparatus 200 selects the white space frequency to be used.

Although not shown, the broadcasting receiving apparatus 100 may further include a signal processor (not shown) and a display (not shown) in addition to the above-described configuration.

The signal processor is configured to perform signal processing on video information and audio information constituting content. In response to a stream signal being received, the signal processor may perform inverse multiplexing on the stream signal, and divide a video signal, an audio signal, and a data signal. The signal processor performs decoding using a decoder in response to the inversely multiplexed video signal being an encoded video signal. For example, the signal processor may decode an encoded video signal of an MPEG-2 standard through an MPEG-2 decoder, and decode a video signal of an H.264 standard of digital multimedia broadcasting (DMB) or DVB-H through an H.264 decoder. Further, the signal processor may perform processing on brightness, tint, hue, or the like of the video signal.

Further, the signal processor may perform processing on an inversely multiplexed audio signal. For example, the signal processor may decode an encoded audio signal of an MPEG-2 standard through an MPEG-2 decoder, and decode an encoded audio signal of an MPEG-4 bit sliced arithmetic coding (BSAC) standard of terrestrial DMB through an MPEG-4 decoder. Further, an encoded audio signal of an MPEG-2 advanced audio coder (AAA) standard of a DMB method or a DVB-H method may be decoded through an AAA decoder. In addition, the signal processor may control base, treble, volume, or the like.

Further, the signal processor may perform data processing on an inversely multiplexed data signal. The signal processor may decode encoded data, and include an electric program guide (EPG) indicating information for programs broadcast in channels as the encoded data. The EPG may be ATSC-Program and System Information Protocol (TSC-PSIP) information in the ATSC method, and EPG information may include Digital video Broadcasting Service Information (DVB-SI) information in the DVB method.

The display displays an image using the signal-processed video signal. The display includes a scaler (not shown), a frame rate converter (not shown), and a video enhancer (not shown). The scaler adjusts an aspect ratio of the image. The video enhancer removes deterioration or noise from the image, and the processed image data is stored in a frame buffer. The frame rate converter adjusts a frame rate, and the image data of the frame buffer is transmitted to a display module according to the set frame rate.

The display module is a circuit configuration which outputs an image to a display panel (not shown), and may include a timing controller (not shown), a gate driver (not shown), a data driver (not shown), and a voltage driver (not shown).

The timing controller generates a gate control signal (a scanning control signal) and a data control signal (a data signal), rearranges input R, G, and B data, and transmits the rearranged R, G, and B data to the data driver. The gate driver applies gate on/off voltages Vgh/Vgl provided from the voltage driver to the display panel according to the gate control signal generated by the timing controller. The data driver inputs R, G, and B data of an image frame, in which scaling is completed, to the display panel according to the data control signal generated by the timing controller. The voltage driver generates driving voltages and transmits the generated driving voltages to the gate driver, the data driver, display panel, or the like.

The display panel may be designed using various techniques. That is, the display panel may be implemented with any one from among an organic light-emitting diode (OLED), a liquid crystal display (LCD) panel, a plasma display panel (PDP), a vacuum fluorescent display (VFD), a field emission display (FED), and electroluminescence display (ELD). The display panel may typically have an emissive type, but the display panel may have a reflective type such as E-ink, P-ink, or photonic crystal. The display panel may be implemented with a flexible display, a transparent display, or the like.

Hereinafter, a configuration and an operation of the external apparatus 200 will be described. Here, description for a configuration of the external apparatus which overlaps that of the broadcasting receiving apparatus 100 will be briefly described or omitted where descriptions are unnecessary.

Figure 6:
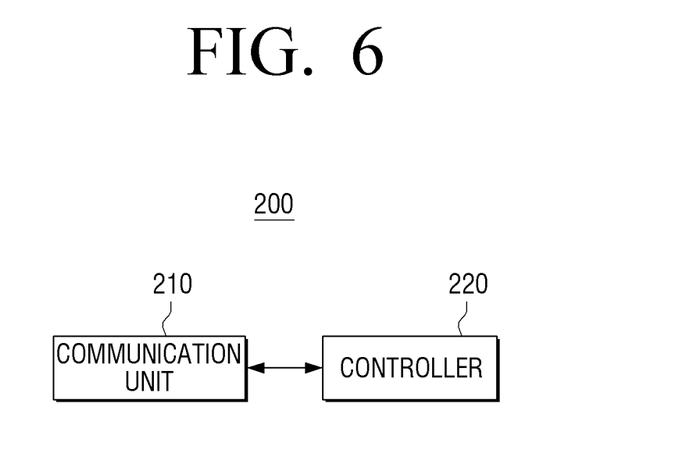
FIG. 6 is a block diagram illustrating a configuration of an external apparatus according to an exemplary embodiment.

FIG. 6 is a block diagram illustrating a configuration of the external apparatus 200 according to an exemplary embodiment.

Referring to FIG. 6, the external apparatus 200 according to an exemplary embodiment includes a communication unit 210 and a controller 220.

The external apparatus may be implemented by various types of devices. For example, the external apparatus may be implemented by any one from among a smart phone, a tablet PC, a smart watch, smart glasses, a PMP, an MPEG audio layer-3 (MP3), a PDA, a cellular phone, a laptop computer, and other mobile terminal apparatuses.

The communication unit 210 is configured to perform communication with the broadcasting receiving apparatus 100 and other external apparatuses. In particular, the communication unit 210 requests information for guide band frequency to the broadcasting apparatus 100, and receives the information for the guide band frequency from the broadcasting receiving apparatus 100.

The communication unit 210 may be implemented with various communication techniques. Typically, the communication unit 210 may include a short-range communication module. At this time, the external apparatus 200 may be connected to a relay apparatus through the short-range communication module and may communicate with the other external apparatuses or the broadcasting receiving apparatus 100.

In an exemplary embodiment, the communication unit 210 may comply with a WiFi communication standard. A WiFi module performs short-range communication which complies with the Institute of Electrical and Electronic Engineers (IEEE) 802.11 technical standard. According to the IEEE 802.11 technical standard, spread spectrum type wireless communication technology called single-carrier DSSS and OFDM type wireless communication technology called multi-carrier OFDM are used.

In another exemplary embodiment, the communication unit may be implemented using various mobile communication techniques. That is, the communication unit 210 may include a cellular communication module which may transmit and receive data using an existing wireless telephone network. For example, 3G mobile communication technology may be applied. That is, at least one technique from among WCDMA, HSDPA, HSUPA, and HSPA may be applied.

Alternatively, 4G mobile communication technology may be applied. According to one exemplary embodiment, 2.3 GHz (portable Internet) mobile WiMAX, or WiBro, is Internet technology which can be used in high-speed moving.

Further, 4G long term evolution (LTE) technology may be applied. LTE is extension technology of WCDMA, and is a technology based on OFDMA technology and MIMO (multiplexing antenna) technology. The 4G LTE technology uses WCDMA technology, and thus has an advantage of using an existing network.

As described above, WiMAX, WiFi, 3G, LTE or the like which has a wide bandwidth and high efficiency may be used. However, in the exemplary embodiment, it is considered that an amount of data transfer is basically not large, and thus more efficient technology may be used. That is, other short-range communication modules such as a Blutooth module, an IrDA module, an NFC module, a Zigbee module, or a WLAN module may be applied.

The controller 220 controls an overall operation of the external apparatus 200. In particular, the controller 220 may control the communication unit 210 to request information for the guide band frequency from the broadcasting receiving apparatus 100, and to receive the information for the guide band frequency from the broadcasting receiving apparatus 100. The controller 220 may set a frequency other than the received guide band frequency as the communication frequency. At this time, the above-described broadcasting receiving apparatus 100 sets frequency of a preset range on the basis of tuned frequency to be the guide band frequency. The guide band frequency is as described above.

In response to the external apparatus 200 using a frequency region of the preset range, the guide band frequency may be set with respect to a region in which interference occurs in the tuned frequency.

The guide band frequency may be set by considering at least one of a signal level and an SNR of the tuned frequency.

As the guide band frequency, frequencies corresponding to an upper-rank one channel and a lower-rank one channel on the basis of the tuned frequency may be set.

The controller 220 may use a frequency region other than the tuned frequency and the set guide band frequency as the white space.

Detailed description of the components has been made as described above, and thus will be omitted herein.

Hereinafter, a signal generating method of a broadcasting receiving apparatus and a signal receiving method of an external apparatus according to various exemplary embodiments will be described.

Figure 7:
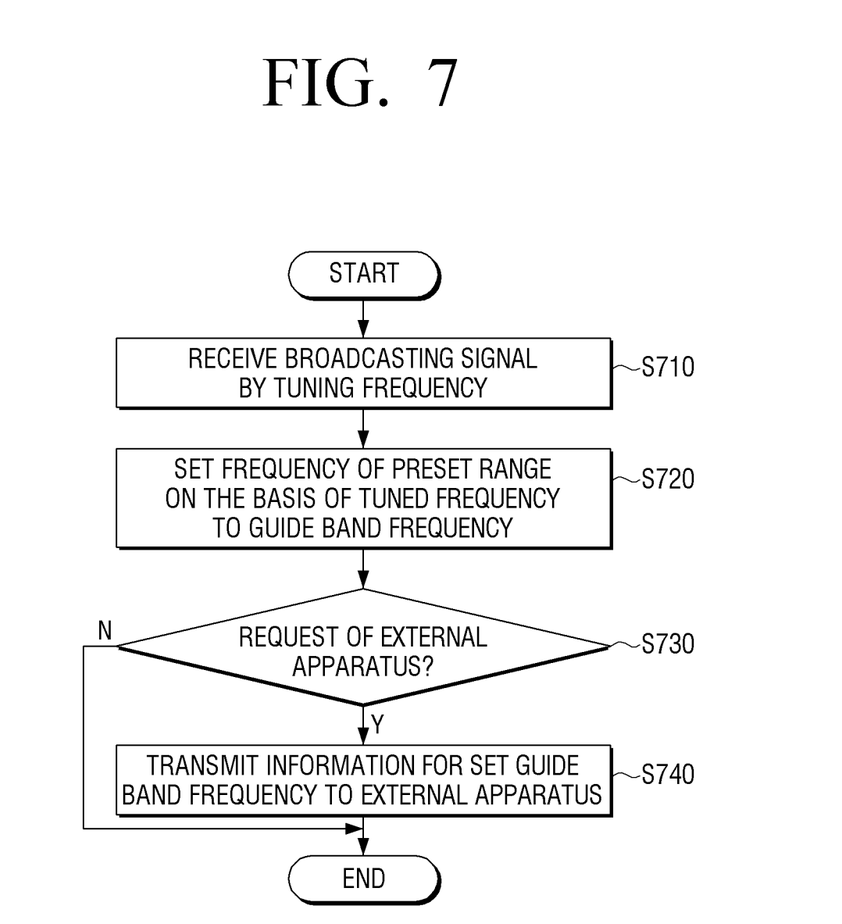
FIG. 7 is a flowchart illustrating a method of generating a signal of a broadcasting receiving apparatus according to another exemplary embodiment.

FIG. 7 is a flowchart illustrating a signal generating method of a broadcasting receiving apparatus according to an exemplary embodiment.

Referring to FIG. 7, the signal generating method of a broadcasting receiving apparatus according to an exemplary embodiment includes receiving a broadcasting signal by tuning frequency (S710), setting frequency of a preset range on the basis of the tuned frequency to guide band frequency (S720), and transmitting information for the set guide band frequency to an external apparatus (S740) in response to a request of the external apparatus (S730).

At this time, the setting of the guide band frequency (S720) may include setting a region in which interference occurs in the tuned frequency to the guide band frequency in response to a frequency region of the preset range being used by the external apparatus.

The setting of the guide band frequency (S720) may include setting the guide band frequency by considering at least one of a signal level and an SNR of the tuned frequency.

Further, the setting of the guide band frequency (S720) may include setting frequencies corresponding to an upper-rank one channel and a lower-rank one channel on the basis of the tuned frequency to the guide band frequency.

The external apparatus may use a frequency region other than the tuned frequency and the set guide band frequency as a white space.

Figure 8:
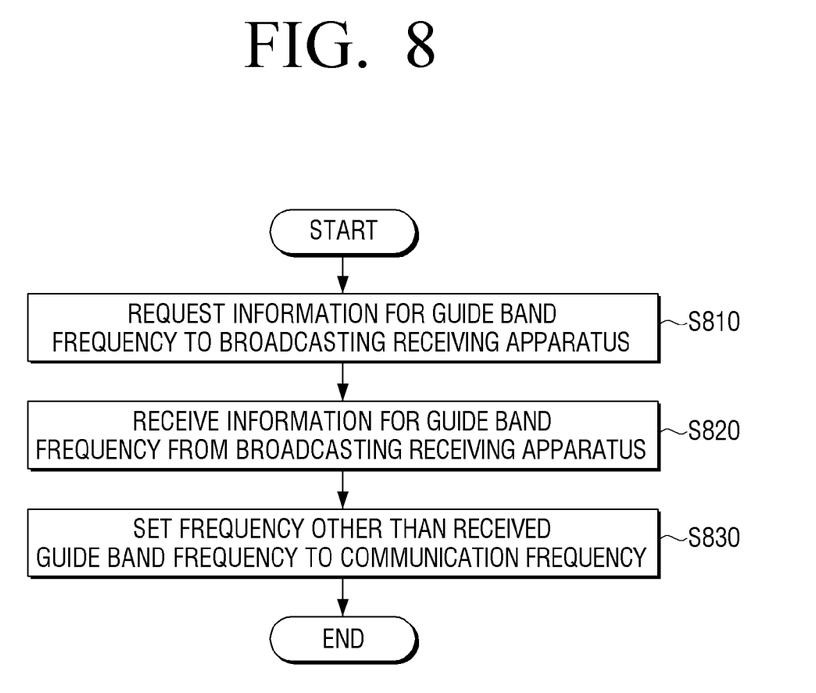
FIG. 8 is a flowchart illustrating a method of receiving a signal of an external apparatus according to an exemplary embodiment.

FIG. 8 is a flowchart illustrating a signal receiving method of an external apparatus according to an exemplary embodiment.

Referring to FIG. 8, the signal receiving method of an external apparatus according to an exemplary embodiment includes requesting information for guide band frequency from a broadcasting receiving apparatus (S810), receiving the information for the guide band frequency from the broadcasting receiving apparatus (S820), and setting frequency other than the received guide band frequency to a communication frequency (S830). The broadcasting receiving apparatus 100 sets frequency of a preset range on the basis of tuned frequency to the guide band frequency.

Here, the guide band frequency may be set with respect to a region in which interference occurs in the tuned frequency in response to a frequency region of the preset range being used by the external apparatus.

The guide band frequency may be set by considering at least one of a signal level and an SNR of the tuned frequency.

Further, frequencies corresponding to an upper-rank one channel and a lower-rank one channel on the basis of the tuned frequency may be set as the guide band frequency.

The setting of the communication frequency may include using the frequency region other than the tuned frequency and the set guide band frequency as a white space The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method for generating a signal of a broadcasting receiving apparatus, the method comprising:
    receiving a broadcasting signal;
    setting a preset frequency range as a guide band frequency based on the tuned frequency; and
    transmitting information for the set guide band frequency to at least one external apparatus;
    wherein the setting the guide band frequency further comprises resetting, by the broadcasting receiving apparatus, the guide band frequency at preset time intervals, wherein the guide band frequency is a frequency band that cannot be used by the at least one external apparatus as white space,
    wherein, in response to a number of the at least one external apparatus and a type of the at least one external apparatus being not limited, the resetting comprises resetting the guide band frequency at a first interval cycle, and
    wherein, in response to a number of the at least one external apparatus and a type of the at least one external apparatus being limited, the resetting comprises resetting the guide band frequency at a second interval cycle which is longer than the first interval cycle.

2. The method as claimed in claim 1, wherein the guide band frequency is set with respect to a region in which interference occurs in the tuned frequency in response to a region of the preset frequency range being used by the at least one external apparatus.

3. The method as claimed in claim 1, wherein the guide band frequency is set according to at least one of a signal level of the tuned frequency and a signal to noise ratio (SNR) of the tuned frequency.

4. The method as claimed in claim 1, wherein the guide band frequency is set to correspond to an upper-rank one channel and a lower-rank one channel of the tuned frequency.

5. The method as claimed in claim 1, wherein the at least one external apparatus uses a frequency region other than the tuned frequency and the set guide band frequency as a white space.

6. A method for receiving a signal to an external apparatus, the method comprising:
    requesting information for guide band frequency from a broadcasting receiving apparatus;
    receiving the information for the guide band frequency from the broadcasting receiving apparatus; and
    setting frequency other than the received guide band frequency to a communication frequency,
    wherein the broadcasting receiving apparatus sets a preset frequency range based on tuned frequency as the guide band frequency, and resets the guide band frequency at preset time intervals, wherein the guide band frequency is a frequency band that cannot be used by the at least one external apparatus as white space,
    wherein, in response to a number of the at least one external apparatus and a type of the at least one external apparatus being not limited, the broadcasting receiving apparatus resets the guide band frequency at a first interval cycle, and
    wherein, in response to a number of the at least one external apparatus and a type of the at least one external apparatus being limited, the broadcasting receiving apparatus resets the guide band frequency at a second interval cycle which is longer than the first interval cycle.

7. The method as claimed in claim 6, wherein the guide band frequency is set with respect to a region in which interference occurs in the tuned frequency in response to a region of the preset frequency range being used by the external apparatus.

8. The method as claimed in claim 6, wherein the guide band frequency is set according to at least one of a signal level of the tuned frequency and a signal to noise ratio (SNR) of the tuned frequency.

9. The method as claimed in claim 6, wherein the guide band frequency is set to correspond to an upper-rank one channel and a lower-rank one channel on the basis of the tuned frequency.

10. The method as claimed in claim 6, wherein the setting to the communication frequency includes using a frequency region other than the tuned frequency and the set guide band frequency as a white space.

11. A broadcasting receiving apparatus comprising:
    a broadcasting receiver configured to receive a broadcasting signal;
    a controller configured to set a preset frequency range as a guide band frequency based on a tuned frequency; and
    a communication unit configured to transmit information for the guide band frequency to at least one external apparatus,
    wherein the controller is further configured to reset the guide band frequency at preset time intervals, the guide band frequency is a frequency band that cannot be used by the at least one external apparatus as white space,
    wherein, in response to a number of the at least one external apparatus and a type of the at least one external apparatus being not limited, the controller resets the guide band frequency at a first interval cycle, and
    wherein, in response to a number of the at least one external apparatus and a type of the at least one external a apparatus being limited, the controller resets the guide band frequency at a second interval cycle which is longer than the first interval cycle.

12. The broadcasting receiving apparatus as claimed in claim 11, wherein the controller sets the guide band frequency with respect to a region in which interference occurs in the tuned frequency in response to a region of the preset frequency range being used by the at least one external apparatus.

13. The broadcasting receiving apparatus as claimed in claim 11, wherein the controller sets the guide band frequency according to at least one of a signal level of the tuned frequency and a signal to noise ratio (SNR) of the tuned frequency.

14. The broadcasting receiving apparatus as claimed in claim 11, wherein the controller sets the guide band frequency to correspond to an upper-rank one channel and a lower-rank one channel according to the guide band frequency.

15. The broadcasting receiving apparatus as claimed in claim 11, wherein the at least one external apparatus uses a frequency region other than the tuned frequency and the set guide band frequency as a white space.

16. An external apparatus comprising:
a communication unit configured to request information for a guide band frequency from a broadcasting receiving apparatus and receive the information for the guide band frequency from the broadcasting receiving apparatus; and
a controller configured to set frequency other than the guide band frequency to a communication frequency,
wherein the broadcasting receiving apparatus sets the guide band frequency based on a preset frequency range and a tuned frequency,
wherein the broadcasting receiving apparatus resets the guide band frequency at preset time intervals, the guide band frequency is a frequency band that cannot be used by the at least one external apparatus as white space,
wherein, in response to a number of the at least one external apparatus and a type of the at least one external apparatus being not limited, the broadcasting receiving apparatus resets the guide band frequency at a first interval cycle, and
wherein, in response to a number of the at least one external apparatus and a type of the at least one external apparatus being limited, the broadcasting receiving apparatus resets the guide band frequency at a second interval cycle which is longer than the first interval cycle.

17. The external apparatus as claimed in claim 16, wherein the guide band frequency is set with respect to a region in which interference occurs in the tuned frequency in response to a region of the preset frequency range being used by the external apparatus.

18. The external apparatus as claimed in claim 16, wherein the guide band frequency is set according to at least one of a signal level of the tuned frequency and a signal to noise ratio (SNR) of the tuned frequency.

19. The external apparatus as claimed in claim 16, wherein the guide band frequency is set to correspond to an upper-rank one channel and a lower-rank one channel on the basis of the tuned frequency.

20. The external apparatus as claimed in claim 16, wherein the controller uses a frequency region other than the tuned frequency and the set guide band frequency as a white space.

21. The broadcasting receiving device of claim 11, wherein a low end of the guide band frequency is set by subtracting the preset frequency range from the tuned frequency, and a high end of the guide band frequency is set by adding the preset frequency range to the tuned frequency.

22. The method of claim 1, wherein a low end of the guide band frequency is set by subtracting the preset frequency range from the tuned frequency, and a high end of the guide band frequency is set by adding the preset frequency range to the tuned frequency.

23. The method of claim 1, wherein the broadcasting receiving apparatus resets the guide band frequency of the broadcasting receiving apparatus in response to a detected change in the tuning frequency of the broadcasting receiving apparatus.

* * * * *